United States Patent [19]

Perry

[11] Patent Number: 5,442,834
[45] Date of Patent: Aug. 22, 1995

[54] WINDSHIELD SCRUBBER AND BLADE WIPING ASSEMBLY

[76] Inventor: Joseph W. Perry, 1820 W. Roma Ave., Phoenix, Ariz. 85015

[21] Appl. No.: 306,577

[22] Filed: Sep. 15, 1994

[51] Int. Cl.⁶ .......................... B60S 1/28; B60S 1/40; B60S 1/44; B60S 1/46
[52] U.S. Cl. ................ 15/250.4; 15/250.41; 15/250.33; 15/250.04
[58] Field of Search ............ 15/250.4, 250.41, 250.11, 15/250.31, 250.33, 250.23, 250.19, 250.35, 250.22, 250.37, 250.04, 250.01, 250.18

[56] References Cited

U.S. PATENT DOCUMENTS 4,719,661  1/1988  Hanselmann ................ 15/250.41
5,168,595  12/1992  Naylor, Jr. ..................... 15/250.4
5,301,384  4/1994  Perry ............................. 15/250.4

FOREIGN PATENT DOCUMENTS 2619633  11/1977  Germany.
WO800155  6/1980  United Kingdom.

Primary Examiner—Gary K. Graham
Attorney, Agent, or Firm—Warren F. B. Lindsley

[57] ABSTRACT

A vehicular window cleaning apparatus having a wiper arm, wiper blade and drive means therefor in combination with a scrubber for intensifying the cleaning effort of the wiper blade. The scrubber is detachably connected to the wiper blade. A cam means is provided for rotating the wiper blade relative to the wiper arm for selectively and sequentially locking the wiper arm and scrubber against an associated windshield.

3 Claims, 1 Drawing Sheet

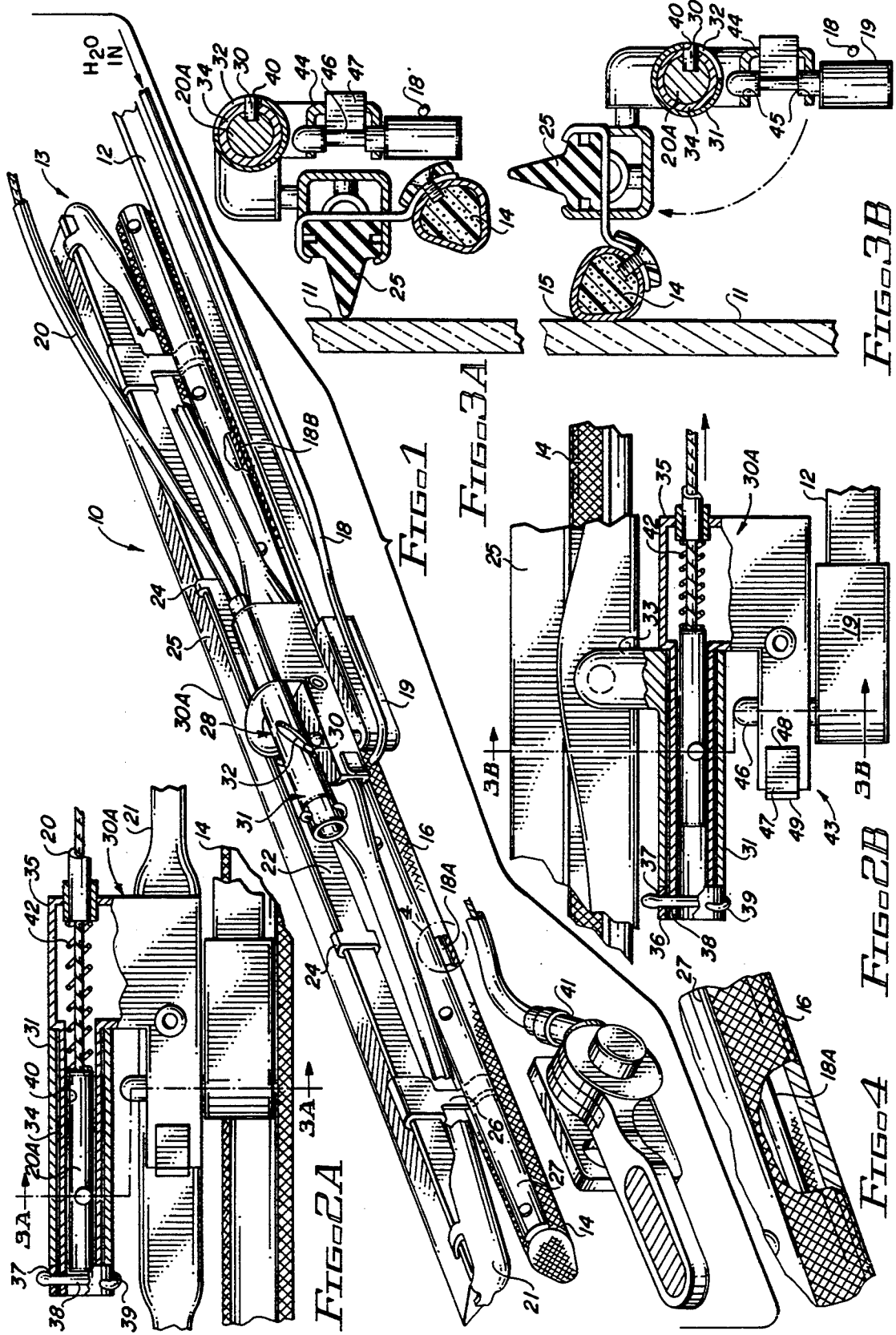

WINDSHIELD SCRUBBER AND BLADE WIPING ASSEMBLY

BACKGROUND OF THE INVENTION

This invention relates to windshield wiper systems and more particularly to a windshield wiping system employing a dual purpose scrubber and wiper blade assembly.

DESCRIPTION OF THE PRIOR ART

Dual purpose scrubber and wiper assemblies have been known wherein a sponge strip is mounted on a wiper blade with the edge of the sponge strip flush with the edge of the wiper blade.

U.S. Pat. No. 5,301,384, owned by the present inventor, discloses a windshield cleaning apparatus having a wiper arm, a wiper blade in combination with a scrubber, and drive means therefor. An adjustment means rotates the wiper blade relative to the wiper arm for selectively and sequentially positioning the wiper blade and the scrubber against the windshield. A locking toggle is provided to lock the blade or the scrubber in position against the windshield.

U.S. Pat. No. 5,168,595 discloses a cam for rotating two wiper blades of differing compositions against a windshield.

U.S. Pat. No. 4,719,661 discloses a windshield wiper assembly which in addition to carrying a wiper blade assembly also carries and additional cleaning device. A tappet controlled by an electromagnet causes the extension of the additional cleaning device past the normal wiper blade.

International Publications No. WO 80/0155 discloses a windshield wiper assembly having a jacking means which can urge a brush against a windshield while causing a wiper blade to be lifted out of contact with the windshield. The jacking device may be operated hydraulically, pneumatically or by a solenoid.

German Patent No. 26 19 633 discloses a wiper blade and brush either or both in contact with a windscreen.

None of the prior art disclose the windshield scrubber and blade wiping assembly set forth herein.

SUMMARY OF THE INVENTION

In accordance with the invention claimed, a new and improved dual purpose scrubber and wiper assembly is provided for vehicle windows wherein the scrubbing and wiping functions may be selectively and sequentially locked in position during use.

It is therefore one object of this invention to provide an improved device for vehicular windshields which combines cleaning and scrubbing functions in a single apparatus.

It is a further object of this invention to provide an improved windshield cleaning and scrubbing apparatus which combines positioning and locking of the cleaning and scrubbing devices against the windshield.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of a windshield wiper assembly for vehicles employing a cleaning device clamped on the wiper blade;

FIG. 2A is partial cross sectional side view of a blade assembly utilized in the present invention with the wiper blade in contact with the windshield;

FIG. 2B is partial cross sectional side view of a blade assembly utilized in the present invention with the scrubbing member in contact with the windshield;

FIG. 3A is a cross sectional view of FIG. 2A taken along the line 3A—3A; and

FIG. 3B is a cross sectional view of FIG. 2B taken along the line 3B—3B.

FIG. 4 is an enlarged view of a portion of FIG. 1 identified by circle 4.

DESCRIPTION OF THE PREFERRED EMBODIMENT

Referring more particularly to the drawings by characters of reference, FIGS. 1–3B disclose a cleaning device 10 for a windshield 11 of a motor vehicle comprising a wiper arm 12 having a blade assembly 13 attached thereto, in addition to a cylindrical member 14 formed of a porous plastic material which yieldingly deforms to a flat surface 15 in contact with the windshield for a scrubbing function. A mesh or net 16 of impermeable material covers the surface of member 14. The reticular surface provided by the net on the flattened surface 15 of cylindrical member 14 greatly enhances the scrubbing action necessary to scrape solids such as insect remains from the windshield 11 without scratching. The net 16 may be secured to the surface of cylindrical member 14 by a variety of means such as stapling, heat sealing, adhesives and the like and is impermeable to moisture.

The wiper arm 12, blade assembly 13 and scrubbing cylindrical member 14 are mounted substantially parallel to each other and spaced sufficiently apart to permit each member to flex and bend under the motion of crossing the windshield without interfering with each other.

Wiper arm 12 is pivotally connected at one end to blade assembly 13 and at the other end to a collar (not shown) which collar is mounted around a motor shaft (also not shown) for driving the wiper arm 12 in a repeatable sequence across the surface of the windshield 11 in a pendulum like manner. Mounting and driving methods for windshield wipers are well known in the art.

Further mounted on wiper arm 12 is a hose or conduit 18 for conducting water, $H_2O$, under pressure from a source in the associated vehicle along wiper arm 12 to its end 19. Conduit 18 further comprises apertured portions 18A and 18B which extend within and along cylindrical member 14 for lubrication purposes. Also mounted parallel to the wiper arm 12 is an actuator 20 for moving blade assembly 13 and cylindrical member 14 relative to windshield 11.

As noted from FIGS. 1–3B, the blade assembly 13 comprises an articulated arm 21 that is attached at its center to wiper arm 12 via a cam means 28. The blade assembly includes a resilient shoe 22 being flexibly mounted to the arm at the center thereof. Both the articulated arm 21 and the resilient shoe 22 further include clamps 24 at each end thereof which form a channel for receiving therethrough the dome shaped configuration of a resilient, plastic or rubber wiper blade 25. The geometrical configuration of the wiper blade 25 and its mounting on the blade assembly 13 are well known in the art.

Cylindrical member 14 is detachably fastened to wiper blade 25 by clamping means 26. This clamping means 26 comprises a backing strip 27 that is secured to the outer circumference of cylindrical member 14 longitudinally thereof with one or more spacedly arranged clamps 26 extending outwardly therefrom and at least partially around wiper blade 25. Thus, cylindrical member 14 is mounted on wiper blade 25 of blade assembly 13 and is movable therewith.

In the normal functioning of blade assembly 13, wiper blade 25 is in contact with the windshield 11 and is moved across it by controls in the vehicle. In order for the operator of the vehicle to provide a scrubbing function, it is necessary to rotate the blade assembly at least partially around the end 19 of wiper arm 12.

To do so, preferably cam means 28 rotatably couples the articulated arm 21 to the wiper arm 12. As best seen in FIG. 1, the cam means 28 comprises a housing 30A with first and second ends 34, 35. The end 34 rotatably supports a hollow, cylindrical cam track body 31. The cam track body 31 includes a curved slot 32 therein and is fixed to the articulated arm 21 by mount 33.

In the preferred embodiment, end 34 extends completely through hollow cam track body 31. A cap 36 has holes 37 which match up with corresponding holes 38 in the portion of end 34 which extends completely through body 31. The insertion of cotter pin 39 through the matching holes 37, 38 mounts the cap 36 to the end 34.

The end 34 is also hollow and includes a longitudinal slot 40. A cam 30 is mounted within the hollow end 34. The cam 30 extends through both the longitudinal slot 40 and the curved slot 32. Optionally, a spring 42 can be positioned to bias the wiper blade 25 to contact with the windshield 11.

To move cam 30 from one end of curved slot 32 to the other end, cam 30 is connected through actuator 20 which extends through end 35. The actuator 20 can include a pneumatic or hydraulic actuating means with the controls located within the vehicle.

In the preferred embodiment, the actuator 20 comprises a known Bowden cable which is connected at one end to a cable control 41 within the vehicle and at the other end 20A to cam 30. Thus, when the control is activated, the Bowden cable moves axially thereof which causes cam 30 to move along both longitudinal slot 40 and curved slot 32. When the cam 30 moves along the curved slot 32, such movement causes the cam track body 31 to rotate. The rotation results in wiper blade 25 rotating away from windshield 11 and causing the scrubber member 14 to contact the surface of the windshield as shown in FIG. 3B.

When the pressure is removed, if included, spring 42 biases wiper blade 25 back into contact with windshield 11 as shown in FIG. 3A. If spring 42 is not included, then the Bowden cable control 41 must be activated to move the wiper blade 25 back into contact with the windshield 11.

Thus, the movement of member 14 is determined by the rotation of wiper blade 25. Further, member 14 is selectively removable from the wiper blade 25 by merely removing clamps 26 forming a part thereof from around the arcuate surface of blade 25.

Housing 30A is mounted to the wiper arm 12 through a mount assembly 43 best illustrated in FIGS. 3A–3B. Housing 30A is preferably welded to the mount assembly 43.

As best seen in FIGS. 3A–3B, the mount assembly 43 comprises a U-shaped member 44 having two matching holes 45 in each leg of the U-shaped member 44. A pylon 46 is mounted at the end 19 of the wiper arm 12 and is long enough to extend through both of the holes 45. To hold the pylon 46 in place, one end of a resilient strip 47 is mounted to the base of the U-shape member 44 such that the strip is engaged with the pylon 46. To further ensure that the pylon 46 remains engaged with the strip 47, the middle portion of the pylon 46 is a smaller diameter than the two end portions. The strip 47 rides between the shoulders of the two end portions when engaging the pylon 46.

The other end of the strip 47 is curved to pass through a slit 48 in the base of the U-shaped member to form a tab 49. Tab 49 allows the user to lift the strip 47 thus disengaging it from the pylon 46. The pylon 46 is withdrawn from the holes 45 thus releasing the blade assembly 13 from the wiper arm 12.

It should be noted as set forth on page 6, second paragraph that a spring based pneumatic motor may be connected to cam 30 to move it along cam track 29 to accomplish the same function as the Bowden Cable control 41 and falls within the scope of this invention.

Although but one embodiment has been illustrated and described, it will be apparent to those skilled in the art that various changes and modifications may be made therein without departing from the spirit of the invention or from the scope of the appended claims.

What is claimed is:

1. A vehicular windshield cleaning apparatus for cleaning a windshield, said apparatus comprising:

a wiper arm, a wiper blade assembly including an elongated wiper blade, a deformable, elongated scrubber detachably clamped to said blade assembly by a coupling such that said blade and said scrubber extend substantially parallel to one another, said deformable scrubber adapted to flatten when placed in contact with the windshield, a conduit coupled with said scrubber for conducting water under pressure from a source to said scrubber for dispersal along the length thereof for intensifying the cleaning effort thereof, cam means rotatably coupling the blade assembly to said wiper arm for rotating and positioning said wiper blade and scrubber relative to said wiper arm for selectively and sequentially locking one of said wiper blade and scrubber of said window cleaning apparatus in contact with the associated windshield, said cam means comprising a housing having first and second ends, said second end being coupled with the wiper arm and said first end being hollow and including a longitudinal slot therein communicating with said hollow, said first end also rotatably supporting a cam track body thereon, said cam track body includes an elongated curved slot therethrough, said cam means further comprises a cam received in said hollow first end and extending through said longitudinal slot and said curved slot such that when said wiper blade is in contact with the windshield said cam is at one end of said curved slot and when said scrubber is in contact with the windshield, said cam is at the other end of said curved slot; and actuator means coupled with said cam for moving said cam between the ends of the longitudinal slot to thereby rotate said wiper blade assembly.

2. The apparatus of claim 1 further comprising a mount assembly for quickly connecting and disconnecting the housing from the wiper arm.

3. The apparatus of claim 1 wherein the actuator means includes a Bowden cable coupled with said cam.

* * * * *